(12) United States Patent
Schenk

(10) Patent No.: US 7,852,742 B2
(45) Date of Patent: Dec. 14, 2010

(54) PRECOMPENSATION OF CROSSTALK INTERFERENCE BASED ON FEEDBACK ERROR SIGNAL

(75) Inventor: Heinrich Schenk, München (DE)

(73) Assignee: Infineon Technologies AG, Neubiberg (DE)

( * ) Notice: Subject to any disclaimer, the term of this patent is extended or adjusted under 35 U.S.C. 154(b) by 708 days.

(21) Appl. No.: 11/565,965

(22) Filed: Dec. 1, 2006

(65) Prior Publication Data

US 2008/0130478 A1   Jun. 5, 2008

(51) Int. Cl.
*H04J 1/12* (2006.01)

(52) U.S. Cl. .................. 370/201; 370/241; 370/249; 375/257; 375/258; 375/259; 375/285; 379/406.01; 379/1.01; 379/1.03; 379/1.04; 379/414; 379/415; 379/416; 379/417

(58) Field of Classification Search ................. 370/201; 375/219–223, 316–352, 257–259, 285; 379/414–417, 379/1.01–35, 406.01–406.16

See application file for complete search history.

(56) References Cited

U.S. PATENT DOCUMENTS

| | | | | |
|---|---|---|---|---|
| 4,995,104 A | * | 2/1991 | Gitlin .................... | 370/201 |
| 5,448,299 A | * | 9/1995 | Yang et al. .............. | 348/475 |
| 7,023,908 B2 | | 4/2006 | Nordstrom et al. ........ | 375/222 |
| 2001/0004383 A1 | * | 6/2001 | Nordstrom et al. ........ | 375/222 |
| 2004/0047426 A1 | * | 3/2004 | Nissani Nissensohn ..... | 375/259 |
| 2004/0218530 A1 | * | 11/2004 | Magal et al. ............. | 370/235 |
| 2005/0280827 A1 | * | 12/2005 | Potma et al. ............. | 356/485 |
| 2006/0146945 A1 | * | 7/2006 | Chow et al. ............. | 375/260 |
| 2007/0268811 A1 | * | 11/2007 | Clausen .................. | 370/201 |
| 2008/0123755 A1 | * | 5/2008 | Clausen .................. | 375/260 |

OTHER PUBLICATIONS

Raphael Cendrillon, et al, Improved Linear Crosstalk Precompensation for DSL, IEEE International Conference on Acoustics, Speech and Signal Processing, 2004.*
Ginis et al. "A Multi-user Precoding Scheme achieving Crosstalk Cancellation with Application to DSL Systems" Asilomar Conf. Signals, Systems, and Computers (pp. 1627-1631), Oct. 2000.
Cendrillon et al. "Improved Linear Crosstalk Precompensation for DSL" IEEE International Conference on Acoustics, Speech, and Signal Processing (pp. 1053-1056), 2004.
Louveaux et al. "Downstream VDSL Channel Tracking Using Limited Feedback for Crosstalk Precompensated Schemes" IEEE International Conference on Acoustics, Speech, and Signal Processing (pp. 337-340), 2005.
ETSI "Transmission and Multiplexing (TM); Access transmission systems on metallic access cables; Very high speed Digital Subscriber Line (VDSL); Part 1: Functional requirements" (pp. 1-82), 2003.

* cited by examiner

*Primary Examiner*—William Trost, IV
*Assistant Examiner*—Charles C Jiang
(74) *Attorney, Agent, or Firm*—Eschweiler & Associates, LLC

(57) ABSTRACT

A device has a plurality of output terminals to provide a plurality of signals to a plurality of transmission links; at least one input terminal to receive information representing a projection of a complex valued error signal onto one direction; and a determination circuit, coupled to the at least one input terminal.

25 Claims, 7 Drawing Sheets

PRECOMPENSATION OF CROSSTALK INTERFERENCE BASED ON FEEDBACK ERROR SIGNAL

TECHNICAL FIELD

This invention relates to transmission lines in general and more particularly to compensation of crosstalk interference.

BACKGROUND

Telecommunication and broadband services are usually provided to customer premises via twisted pairs of wires. The twisted pairs are often grouped in close proximity into binder groups. Data transmission in these settings may suffer from interference arising from electromagnetic coupling between neighboring twisted pairs, referred to as crosstalk interference. When crosstalk precompensation is employed, the signal to be transmitted is pre-distorted such that the pre-distortion destructively interferes with the crosstalk introduced by the transmission channel.

DETAILED DESCRIPTION

Figure 1:
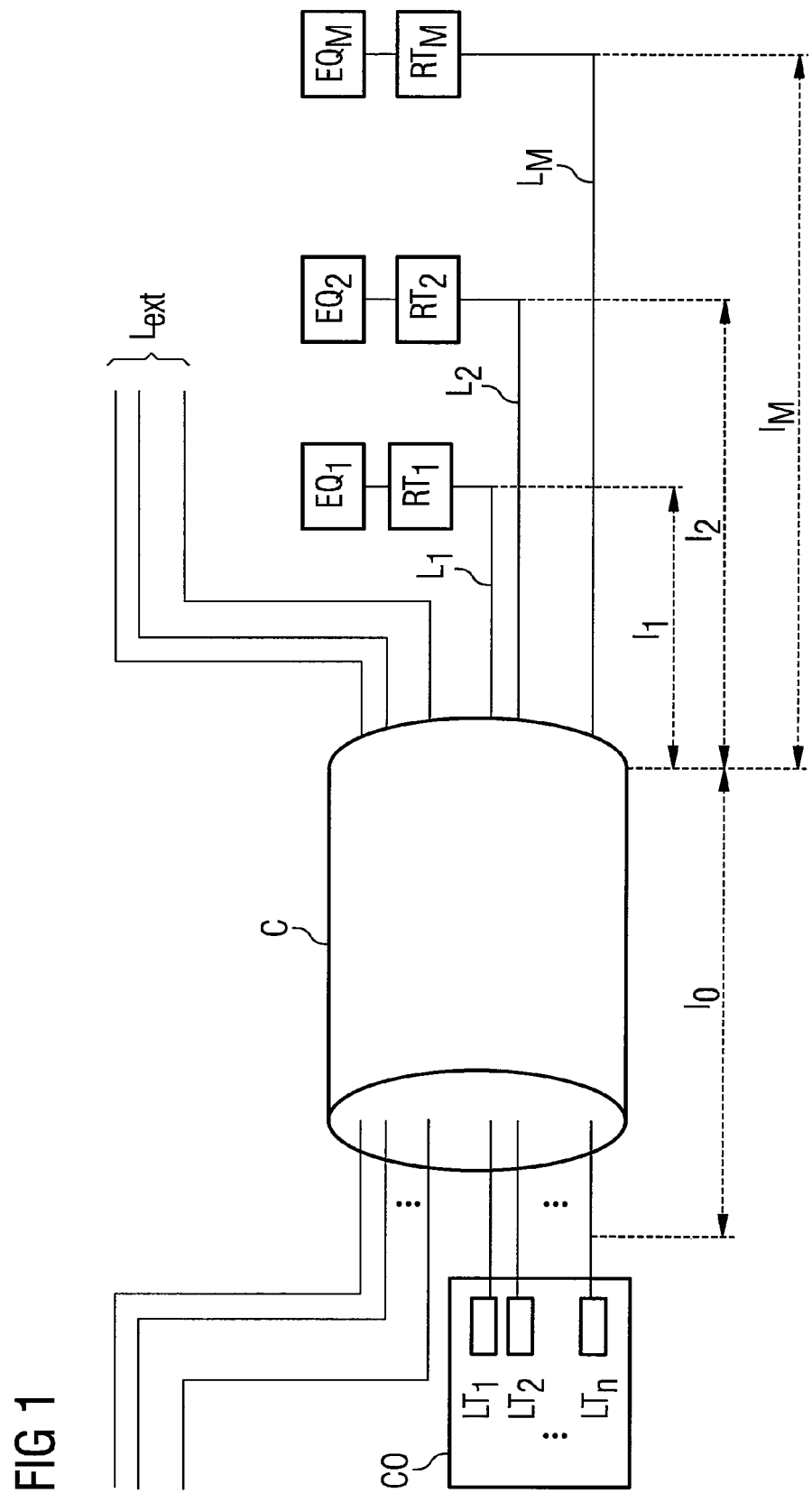
FIG. 1 schematically illustrates a network of a plurality of transmission lines $L_1$ to $L_M$ according to an embodiment.

In the following embodiments are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments. It may be evident, however, to one skilled in the art that one or more aspects of the embodiments may be practiced with a lesser degree of these specific details. In other instances, known structures and devices are shown in block diagram form in order to facilitate describing one or more aspects of the embodiments. The following description is therefore not to be taken in a limiting sense, and the scope of the invention is defined by the appended claims.

Referring to FIG. 1, a schematic diagram of a network of a plurality of transmission lines $L_1$ to $L_M$ is shown. The transmission lines $L_1$ to $L_M$ are bundled together within a cable C over a length $l_0$. The network has a central office CO comprising a plurality of transceivers $LT_1$ to $LT_M$ coupled to the respective ends of the transmission lines $L_1$ to $L_M$. At the subscriber premises transceivers $RT_1$ to $RT_M$ are coupled to the other respective ends of the transmission lines $L_1$ to $L_M$. The transceivers $RT_1$ to $RT_M$ may, for example, be modems. Data transmission from the central office CO to a subscriber is called downstream data transmission, whereas data transmission from a subscriber to the central office CO is called upstream data transmission.

While transmission lines $L_1$ to $L_M$ may have all a same length, it is to be noted that they may also have different lengths. In the network shown in FIG. 1 the length of a transmission line $L_i$ is the sum of the length $l_0$ and a length $l_i$ (i=1, . . . , M). The length $l_0$ is the length over which the transmission lines $L_1$ to $L_M$ are bundled together and occupy the same cable C. The length $l_i$ is the length from the end of the cable C to the transceiver $RT_i$. Each of the transmission lines $L_1$ to $L_M$ may, for example, be a pair of twisted wires.

Furthermore, it is to be noted that the cable C may comprise transmission lines $L_{ext}$, which are not coupled to the central office CO.

The transmission lines $L_1$ to $L_M$ may form a telecommunication channel. Since voice telephony uses only a small fraction of the bandwidth usually available on the transmission lines $L_1$ to $L_M$, the remaining fraction of the available bandwidth may be used for transmitting data. For data transmission there are a number of services available, such as ISDN (Integrated Services Digital Network) or ADSL (Asymmetric Digital Subscriber Line) or VDSL (Very high bit-rate Digital Subscriber Line) or VDSL2 (Very high bit-rate Digital Subscriber Line 2).

In systems such as the system shown in FIG. 1, due to the proximity of the transmission lines $L_1$ to $L_M$ within the cable C of the length $l_0$, crosstalk interference between different neighboring transmission lines $L_1$ to $L_M$ exists. Depending on the location where the crosstalk is introduced, two types of interference are distinguished which are explained in the following: near-end crosstalk (NEXT) and far-end crosstalk (FEXT).

NEXT refers to interference between neighboring transmission lines $L_1$ to $L_M$ that arises when signals are transmitted in opposite directions. If the neighboring transmission lines $L_1$ to $L_M$ carry the same type of service, then the interference is called self-NEXT.

FEXT refers to interference between neighboring transmission lines $L_1$ to $L_M$ that arises when signals are transmitted in the same direction. If the neighboring transmission lines $L_1$ to $L_M$ carry the same type of service, such as VDSL, then the interference is called self-FEXT.

Furthermore, noise can be coupled to the transmission lines $L_1$ to $L_M$ that is generated by other sources than neighboring transmission lines $L_1$ to $L_M$. This noise is called alien noise and may, for example, be generated by the transmission lines $L_{ext}$.

If different frequency bands are used for downstream data transmission and upstream data transmission, which is for example the case in VSDL, NEXT does not affect the transmission quality. However, FEXT causes more serious problems. The longer the length of the transmission line, the more the signal transmitted over the transmission line is attenuated and FEXT is increased.

In upstream data transmission the receiving modems, which are the transceivers $LT_1$ to $LT_M$, are co-located at the central office CO. This allows joint reception of the signals transmitted over the transmission lines $L_1$ to $L_M$, thereby enabling crosstalk cancellation.

In downstream data transmission the receiving modems, which are the transceivers $RT_1$ to $RT_M$, reside within different customer premises so that crosstalk cancellation is not possible. However, since in downstream data transmission the transmitting modems, which are the transceivers $LT_1$ to $LT_M$, are co-located at the central office CO, it is possible to employ crosstalk precompensation. In crosstalk precompensation the signal to be transmitted is pre-distorted such that the pre-distortion compensates the crosstalk introduced by the channel.

For calculating precompensation for a transmission line, information of the signals transmitted concurrently over the other transmission lines and information of the crosscoupling of these signals onto the transmission lines are required, which will be described below for an exemplary embodiment of a communication system in more detail, wherein the frequency band used for transmitting signals in downstream direction is different from the frequency band used for transmitting signals in upstream direction. As a consequence, in this exemplary embodiment, self-NEXT can be excluded as a source of interference, however self-FEXT must be considered. For example, VDSL and ADSL may be used as services for transmitting data over the transmission lines and DMT (discrete multi-tone) modulation may be used for modulating signals, however the embodiment described in the following is not limited thereto. While the following description is provided with respect to systems using different frequency bands for transmitting in downstream and upstream direction, it is to be noted that according to other embodiments a system may use the same frequency band, but different time slots for downstream and upstream directions.

Figure 2:
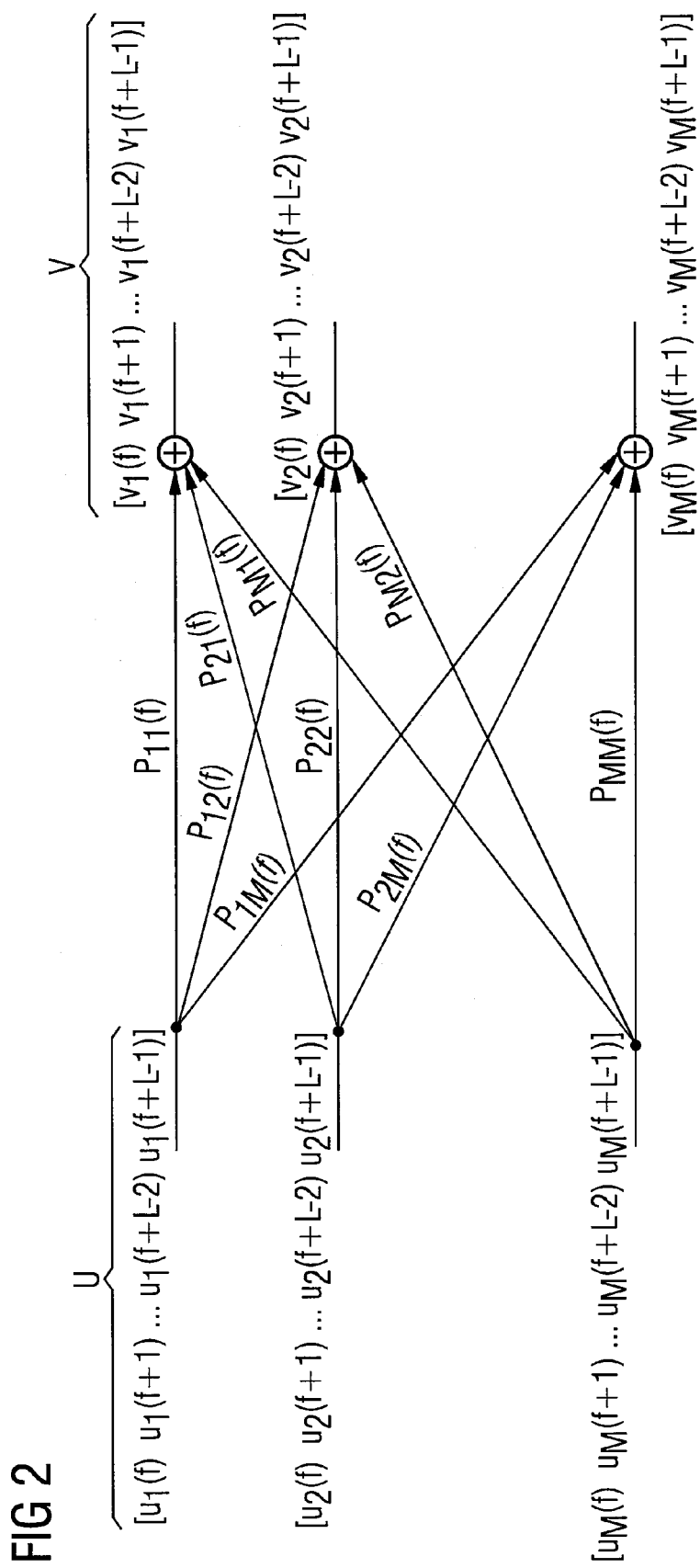
FIG. 2 illustrates a precompensation model for a transmission network having several frequency channels.

For precompensating self-FEXT, the signals $u_i(f)$ to be transmitted are listed in a matrix U as shown on the left hand side of the diagram of FIG. 2, wherein f is the frequency (or tone). The matrix U is multiplied by a precompensation matrix P. This matrix multiplication results in a matrix V that is shown on the right hand side of the diagram of FIG. 2. Since DMT transmission is employed and interconnections between different frequency channels do not occur, it is possible to model crosstalk independently on each frequency. Therefore the matrix U can be reduced to a vector u comprising the signals $u_1$ to $u_M$ to be transmitted over the transmission lines $L_1$ to $L_M$:

$$u = \begin{bmatrix} u_1 \\ u_2 \\ \vdots \\ u_M \end{bmatrix} \quad (1)$$

where all signals $u_1$ to $u_M$ have the same carrier frequency. The vector u is multiplied with $P^T$, which is the transpose of the precompensation matrix P, to obtain a vector v that comprises precompensated signals $v_1$ to $v_M$ which are emitted from the transceivers $LT_1$ to $LT_M$, respectively:

$$v = P^T \cdot u \quad (2)$$

$$v = \begin{bmatrix} v_1 \\ v_2 \\ \vdots \\ v_M \end{bmatrix} \quad (3)$$

Figure 3:
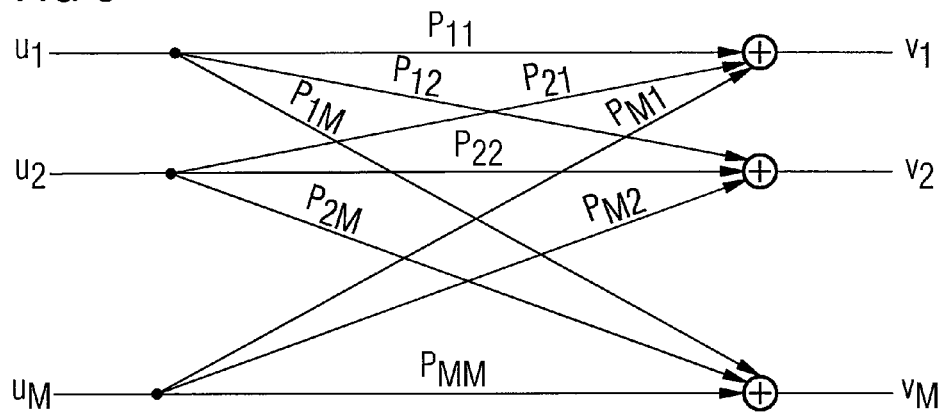
FIG. 3 illustrates a precompensation model for a single frequency channel of a transmission network.

The precompensation of the signals $u_1$ to $u_M$ by the precompensation matrix P is schematically illustrated in FIG. 3.

The signals $v_1$ to $v_M$ are emitted from the transceivers $LT_1$ to $LT_M$ and experience crosstalk interference while being transmitted over the transmission lines $L_1$ to $L_M$, respectively.

Figure 4:
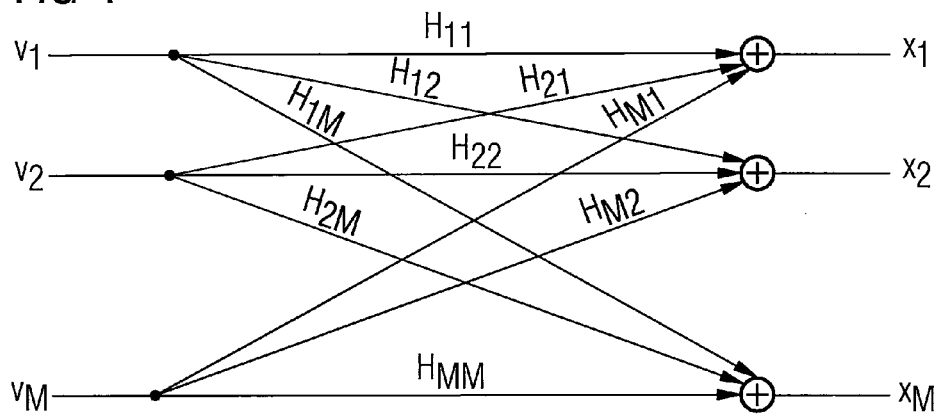
FIG. 4 illustrates an interference channel model showing crosstalk interference among the transmission lines $L_1$ to $L_M$.

In FIG. 4 an interference channel model is illustrated exhibiting crosstalk interference among the transmission lines $L_1$ to $L_M$. The signal $v_i$ is provided to the input terminal of a transmission line $L_i$ and a signal $x_j$ is received at the output terminal of the transmission line $L_j$. A transfer function $H_{ij}$ is the transfer function of a channel from the input terminal of the transmission line $L_i$ to the output terminal of the transmission line $L_j$ for a specific frequency channel. The transfer function $H_{ii}$ are the transfer functions of the transmission lines $L_1$ to $L_M$, and the transfer functions $H_{ij,i \neq j}$ are the crosstalk transfer functions caused by self-FEXT.

Apart from self-FEXT signals other interfering signals $n_i$ disturb the signals transmitted between the transceivers $LT_i$ and $RT_i$. The interfering signals $n_i$ are caused by alien noise which may be due to the transmission lines $L_{ext}$, which are not coupled to the central office CO, and other external sources. Therefore, a signal $y_i$ received at the output terminal of the transmission line $L_i$ is the sum of the signals $x_i$ and $n_i$:

$$y = x + n \quad (4)$$

$$x = \begin{bmatrix} x_1 \\ x_2 \\ \vdots \\ x_M \end{bmatrix} \quad (5)$$

$$y = \begin{bmatrix} y_1 \\ y_2 \\ \vdots \\ y_M \end{bmatrix} \quad (6)$$

The transfer functions $H_{ii}$ and $H_{ij,i \neq j}$ can be combined to an M×M transmission matrix M so that the vector x is given by:

$$x = H^T \cdot v \quad (7)$$

Combining equations (2) and (7) provides:

$$x = H^T \cdot P^T \cdot u \quad (8)$$

The received signals $y_1$ to $y_M$ are demodulated and afterwards equalized in an equalizer EQ. Therefore, the vector y is to be multiplied by a diagonal matrix F in which the entries outside the main diagonal are all zero and the main diagonal entries themselves are the reciprocal values of the transfer functions $H_{ii}$, which are the diagonal entries of the transmission matrix H:

$$z = F \cdot y = F \cdot (x + n) = F \cdot (H^T \cdot P^T \cdot u + n) \quad (9)$$

$$F = (diag(H))^{-1} \quad (10)$$

$$z = \begin{bmatrix} z_1 \\ z_2 \\ \vdots \\ z_M \end{bmatrix} \quad (11)$$

By assuming that noise can be neglected, the precompensation matrix P is chosen in a manner that the vectors u and z are identical. The requirement of vectors u and z to be identical reflects the condition that the signals finally received by the transmission system shall be the same as the signals initially provided at the input. This results in an equation which can be used to determine the precompensation matrix P:

$$F \cdot H^T \cdot P^T = I \quad (12)$$

where I is an M×M identity matrix with ones on the main diagonal and zeros elsewhere. Equation (12) can be transformed to an equation to compute the transpose of the precompensation matrix P:

$$P^T = (F \cdot H^T)^{-1} \quad (13)$$

The elements of the transmission matrix H may according to one embodiment be directly determined and the precompensation matrix P can be computed by using equations (10) and (13). The elements of the transmission matrix H are in this embodiment determined by transmitting signals over the transmission lines $L_1$ to $L_M$. The signals emitted from the transceivers $LT_1$ to $LT_M$ are known in the transceivers $RT_1$ to $RT_M$. The elements of the transmission matrix H are calculated by dividing the received signals by the known signals. The described method may be repeatedly performed and the received signals may be averaged.

Figure 5:
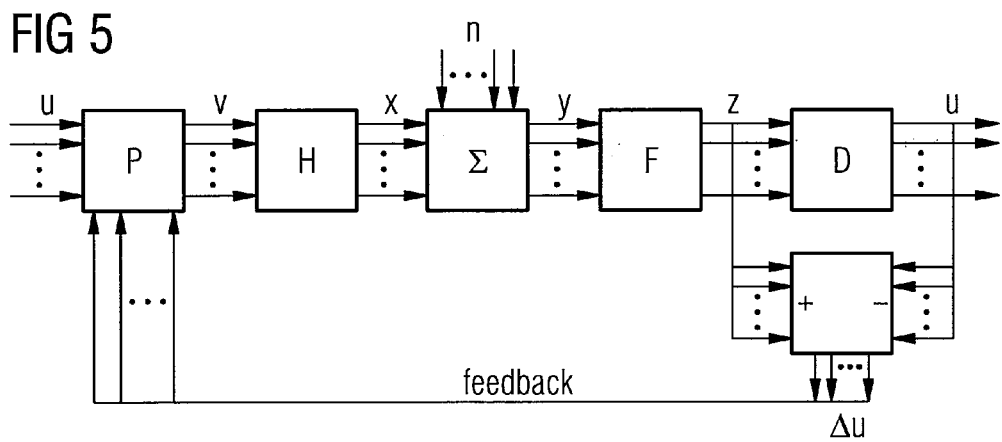
FIG. 5 illustrates a method and a transmission system according to an embodiment.

According to a further embodiment, the elements of the precompensation matrix P may be determined by using an iterative method (with k being the time index of the iterative method). The general proceeding when performing this method is illustrated in FIG. 5. Signals u are precompensated using the precompensation matrix P to obtain signals v. The signals v are simultaneously transmitted over the transmission lines $L_1$ to $L_M$ where they are subject to crosstalk interference and noise n. Signals y are received at the output terminals of the transmission lines $L_1$ to $L_M$ by the transceivers $RT_1$ to $RT_M$. The received signals y are equalized in equalizers $EQ_1$ to $EQ_M$ using the diagonal matrix F. The equalized signals z are provided to a decider D. The decider D estimates which signal $u_i$ is closest to the signal $z_i(k)$ and outputs the difference between the signals $z_i(k)$ and $u_i$ as an error signal $\Delta u_i(k)$. Alternatively, the signal $u_i$ may be known at the transceiver $RT_i$ and the error signal $\Delta u_i(k)$ may then be the difference between the signal $z_i(k)$ and the signal $u_i$ known at the transceiver $RT_i$. A vector $\Delta u$ containing the error signals $\Delta u_i(k)$ is fed back to the central office CO and is used there to calculate the elements of the precompensation matrix P. According to one embodiment, the error signals $\Delta u_1(k)$ to $\Delta u_M(k)$ are fed back to the central office CO via the transmission lines $L_1$ to $L_M$, respectively.

The signals u may be uncorrelated or may be correlated to a certain degree. For example, a scrambler may be used to generate the signals u.

Initially when starting the iterative method the precompensation matrix P is an M×M identity matrix. The identity matrix has ones on the main diagonal and zeros elsewhere. The identity matrix corresponds to a transmission network where crosstalk interference is not precompensated. Adjusting the elements of the precompensation matrix P to appropriate values is carried out by using the error signals $\Delta u$.

According to one embodiment, the precompensation matrix P is determined by using a least mean square algorithm. For that, signals $u_1(k)$ to $u_M(k)$ are processed as shown in FIG. 5. At the transceivers $RT_1$ to $RT_M$ the error signals $\Delta u_1(k)$ to $\Delta u_M(k)$ are calculated and are fed back to the transceivers $LT_1$ to $LT_M$. At the central office CO the entries $P_{\nu\mu}(k+1)$ of the precompensation matrix P are calculated by means of the least mean square algorithm:

$$P_{\nu\mu}(k+1) = P_{\nu\mu}(k) - g \cdot u_\nu^*(k) \cdot \Delta u_\mu(k) \quad (14)$$

where $u_\nu^*(k)$ denotes the complex conjugate of $u_\nu(k)$ and $\nu, \mu = 1, 2, \ldots, M$. The coefficient g defines the time the iterative method needs to converge and the accuracy of the iterative method. For reasons of stability the coefficient g shall not exceed a predetermined threshold value.

During the iteration cycle k+1 the signals $u_1(k+1)$ to $u_M(k+1)$ are precompensated using the entries $P_{\nu\mu}(k+1)$ of the precompensation matrix P. The aforesaid iterative method is repeated until the entries $P_{\nu\mu}(k+1)$ of the precompensation matrix P converge.

Since the aforesaid method includes that the error signals $\Delta u_1(k)$ to $\Delta u_M(k)$ are fed back to the central office CO via the transmission lines $L_1$ to $L_M$ for example within a DMT frame. This may result in a considerable amount of data that must be transferred over the transmission lines $L_1$ to $L_M$ in order to accomplish the method. If the method is applied to several frequency channels, even more data need to be transmitted over the transmission lines $L_1$ to $L_M$.

The amount of data to be fed back to the central office CO can be reduced by quantizing the real and/or imaginary parts of the error signals $\Delta u_1(k)$ to $\Delta u_M(k)$ at the customer premises and feeding back the quantized error signals instead of the original error signals $\Delta u_1(k)$ to $\Delta u_M(k)$. Quantizing may, for example, mean that a signal is reduced to an information unit, for example 0 or 1. Quantizing may, for example, also mean detecting whether or not a signal exceeds a threshold value. The quantized real and/or imaginary parts are used at the central office CO to compute the elements of the precompensation matrix P. For example, only the signs of the real and imaginary parts of each error signal $\Delta u_i(k)$ are transmitted to the central office CO. The entries $P_{\nu\mu}(k+1)$ of the precompensation matrix P are then computed as follows:

$$P_{\nu\mu}(k+1) = P_{\nu\mu}(k) - g \cdot u_\nu^*(k) \cdot [sgn(Re\{\Delta u_\mu(k)\}) + j \cdot sgn(Im\{\Delta u_\mu(k)\})] \quad (15)$$

With the above described iterative determination of the precompensation matrix P, a further reduction of data may be achieved by feeding back to the central office CO for each error signal $\Delta u_i(k)$ only information representing a projection of the error signal $\Delta u_i(k)$ onto one direction, for example onto the real axis or the imaginary axis. For example, only either the quantized real part or the quantized imaginary part of the error signal $\Delta u_i(k)$ is fed back. For example, only the sign of the real part or the sign of the imaginary part of the error signal $\Delta u_i(k)$ is transmitted over the transmission line $L_i$ to the central office CO. This means that for each error signal $\Delta u_i(k)$ only one bit is transmitted over the transmission line $L_i$. If the signs of the real parts of the error signals $\Delta u_1(k)$ to $\Delta u_M(k)$ are fed back to the central office CO, the entries $P_{\nu\mu}(k+1)$ of the precompensation matrix P are calculated as follows:

$$P_{\nu\mu}(k+1) = P_{\nu\mu}(k) - g \cdot u_\nu^*(k) \cdot sgn(Re\{\Delta u_\mu(k)\}) \quad (16)$$

If the signs of the imaginary parts of the error signals $\Delta u_1(k)$ to $\Delta u_M(k)$ are fed back to the central office CO, the entries $P_{\nu\mu}(k+1)$ of the precompensation matrix P are calculated as follows:

$$P_{\nu\mu}(k+1) = P_{\nu\mu}(k) - g \cdot u_\nu^*(k) \cdot sgn(Im\{\Delta u_\mu(k)\}) \quad (17)$$

It is noted that the above described iterative approximation of the precompensation matrix P may also be provided by mixing the fed back of quantized real parts and quantized imaginary parts. For example, the quantized real parts and the quantized imaginary parts of the error signals $\Delta u_1(k)$ to $\Delta u_M(k)$ may be fed back in an alternating manner.

While the above describes quantized feed back of the error signal, quantized values of the signals $u_\nu(k)$ may be used for computing equation (14). Since equation (14) cannot be computed before values for the error signals are fed back to the central office CO, the signals $u_v(k)$ must be stored. The size of the buffer needed for storing the signals $u_v(k)$ can be reduced when the signals $u_v(k)$ are quantized before storage reducing the effort of implementation. Thus, according to one embodiment, after emitting the signals $u_1(k)$ to $u_M(k)$ to the transmission lines $L_1$ to $L_M$, quantized values of the signals $u_1(k)$ to $u_M(k)$ are stored in a buffer. These values are used to compute equation (14).

For example, according to one embodiment, only the signs of the real parts and the imaginary parts of the signals $u_1(k)$ to $u_M(k)$ may be used to compute the entries $P_{v\mu}(k+1)$ of the precompensation matrix P:

$$P_{v\mu}(k+1)=P_{v\mu}(k)-g\cdot[sgn(Re\{u_v(k)\})-j\cdot sgn(Im\{u_v(k)\})]\cdot \Delta u_\mu(k) \quad (18)$$

According to a further embodiment, only the signs of the real parts (cf. equation (19)) or the signs of the imaginary parts (cf. equation (20)) are used to compute the entries $P_{v\mu}(k+1)$ of the precompensation matrix P:

$$P_{v\mu}(k+1)=P_{v\mu}(k)-g\cdot sgn(Re\{u_v(k)\})\cdot \Delta u_\mu(k) \quad (19)$$

$$P_{v\mu}(k+1)=P_{v\mu}(k)+g\cdot sgn(Im\{u_v(k)\})\cdot \Delta u_\mu(k) \quad (20)$$

According to a further embodiment, both the error signals $\Delta u_1(k)$ to $\Delta u_M(k)$ and the signals $u_1(k)$ to $u_M(k)$ are quantized for computing equation (14). For example, only the signs of the real and imaginary parts of these signals are used:

$$P_{v\mu}(k+1)=P_{v\mu}(k)-g\cdot[sgn(Re\{u_v(k)\})-j\cdot sgn(Im\{u_v(k)\})]\cdot[sgn(Re\{\Delta u_\mu k)\})+j\cdot sgn(Im\{\Delta u_\mu(k)\})] \quad (21)$$

In equation (21) the signs of the real parts and imaginary parts can be either +1 or −1. Thus the product of the two terms enclosed by brackets can be 2+j·2, 2−j·2, −2+j·2, −2−j·2, 2, −2, j·2, −j·2 or 0. If the coefficient g is multiplied by 2, then the product of the two terms enclosed by brackets can be 1+j, 1−j, −1+j, −1−j, 1, −1, j, −j or 0.

While in equation (21), the signs of the real and imaginary part of both the error signals $\Delta u_1(k)$ to $\Delta u_M(k)$ and the signals $u_1(k)$ to $u_M(k)$ are used, equation (21) can be further simplified by using only the real parts of the error signals $\Delta u_1(k)$ to $\Delta u_M(k)$:

$$P_{v\mu}(k+1)=P_{v\mu}(k)-g\cdot[sgn(Re\{u_v(k)\})-j\cdot sgn(Im\{u_v(k)\})]\cdot sgn(Re\{\Delta u_\mu(k)\}) \quad (22)$$

The product $[sgn(Re\{u_v(k)\})-j\cdot sgn(Im\{u_v(k)\})]\cdot sgn(Re\{\Delta u_\mu(k)\})$ can be 2+j, 2−j, −2+j, −2−j, j or −j.

Equation (21) can also be simplified by using only the imaginary parts of the error signals $\Delta u_1(k)$ to $\Delta u_M(k)$:

$$P_{v\mu}(k+1)=P_{v\mu}(k)-g\cdot[sgn(Re\{u_v(k)\})-j\cdot sgn(Im\{u_v(k)\})]\cdot sgn(Im\{\Delta u_\mu(k)\}) \quad (23)$$

The product $[sgn(Re\{u_v(k)\})-j\cdot sgn(Im\{u_v(k)\})]\cdot sgn(Im\{\Delta u_\mu(k)\})$ can be 1+j·2, 1−j·2, −1+j·2, −1−j·2, 1 or −1.

While the above described embodiments address the signals and error signals required for calculating the precompensation matrix P, other embodiments address the factor g used in equations (14) to (23). According to one embodiment, multiplication by the coefficient g can be accomplished by using the following equation for the coefficient g:

$$g=2^{-L} \quad (24)$$

where the parameter L is an integer.

Equation (24) simplifies computation of the entries $P_{v\mu}(k+1)$ of the precompensation matrix P because the multiplication by the coefficient g can be accomplished by a shifting operation. The parameter L determines the time the iterative method needs to converge and the accuracy of the iterative method. If a small value is chosen for the parameter L, a fast convergence is achieved. A higher value of the parameter L results in higher accuracy of the entries $P_{v\mu}(k+1)$ of the precompensation matrix P.

Furthermore, according to one embodiment, the value of the parameter L may be changed within the iteration. For example, when starting the iterative method a small value is chosen for the parameter L and after a predetermined time the parameter L is increased by a predetermined integer value. Subsequently this operation may be continued until a maximum value of the parameter L is reached. This allows to decrease the time of convergence of the iterative method.

Further embodiments address the time of updating of the entries $P_{v\mu}(k)$. For example, according to one embodiment, the entries $P_{v\mu}(k)$ of the precompensation matrix P are updated after predetermined intervals. Further, when updating the entries $P_{v\mu}(k)$ it is not necessary to transmit the quantized real parts or imaginary parts of the error signals $\Delta u_1(k)$ to $\Delta u_M(k)$ simultaneously to the central office CO. In fact the transmission of the feedback information may be spread over several DMT frames.

Furthermore, a control unit may be provided to monitor the crosstalk interference occurring at the customer premises. The control unit initiates an update of the entries $P_{v\mu}(k)$ of the precompensation matrix P if the crosstalk interference exceeds a predetermined threshold value.

While the entries $P_{v\mu}(k)$ of all elements of the precompensation matrix P may be varied during the iteration process as described above, elements of the precompensation matrix P may be provided fixed during the iteration as will be described in the following. According to this embodiment, as already described above, signals $u_1$ to $u_M$ are provided to the transmission lines $L_1$ to $L_M$, respectively. The signals $u_1$ to $u_M$ are transmitted over the transmission lines $L_1$ to $L_M$, respectively, and are received at the other ends of the transmission lines $L_1$ to $L_M$ as signals $z_1$ to $z_M$, respectively. For each of the signals $z_1$ to $z_M$ an error signal $\Delta u_1$ to $\Delta u_M$ is determined. The error signals $\Delta u_1$ to $\Delta u_M$ are the error signals between the signals $z_1$ to $z_M$ and estimated versions of the signals $u_1$ to $u_M$, respectively. The error signals $\Delta u_1$ to $\Delta u_M$ are fed back via the transmission lines $L_1$ to $L_M$ to the transceivers $LT_1$ to $LT_M$. At the central office CO the fed back error signals $\Delta u_1$ to $\Delta u_M$ are used to determine a crosstalk precompensation matrix P.

However, the entries $P_{vv}(k)$ of the main diagonal of the precompensation matrix P are predetermined and remain unchanged. For example, all entries $P_{vv}(k)$ of the main diagonal of the precompensation matrix P are set to one.

Since the elements of the main diagonal of the matrix $F\cdot H^T$ are approximately one and the elements of the secondary diagonal are much smaller than one, the elements of the secondary diagonal of the precompensation matrix P are much smaller than one. This results in signals after precompensation having signal strengths which are almost identical to the signal strengths before precompensation.

At the customer premises the signals $y_1$ to $y_M$ received from the transmission lines $L_1$ to $L_M$ may be equalized using equalizers $EQ_1$ to $EQ_M$, respectively. The equalizers $EQ_1$ to $EQ_M$ compensate for the attenuation and/or the phase shift occurring during the transmission over the transmission lines $L_1$ to $L_M$. When adjusting the coefficients of the equalizers $EQ_1$ to $EQ_M$, this may interfere with setting the elements of the precompensation matrix P. For example, this interference may lead to deviations of the transmission power levels from the desired values. By having fixed main diagonal elements of the precompensation matrix P, the method described above avoids that setting of the precompensation matrix P interferes with setting the coefficients of the equalizers $EQ_1$ to $EQ_M$.

Instead of having fixed main diagonal matrix elements, for each column of the precompensation matrix P the value of the sum $R_\mu$ of the squared entries $|P_{v\mu}|^2$ of the column $\mu$ may according to a further embodiment be predetermined and remains essentially unvaried:

$$R_\mu = \sum_{v=1}^{M} |P_{v\mu}|^2 \quad (25)$$

In an alternative embodiment where a transposed precompensation matrix P is used, the value of the sum of the squared entries of each column is predetermined.

Similar to the above embodiment, having fixed sums $R_\mu$ avoids that setting of the elements of the precompensation matrix P interferes with setting the coefficients of the equalizers $EQ_1$ to $EQ_M$.

According to a further embodiment, the target value of the sums $R_\mu$ is one. An error vector $\Delta R$ describing the error between the sums $R_1$ to $R_M$ and the target value can be defined as follows:

$$\Delta R = R - 1 \quad (26)$$

$$\Delta R = \begin{bmatrix} \Delta R_1 \\ \Delta R_2 \\ \vdots \\ \Delta R_M \end{bmatrix} \quad (27)$$

$$R = \begin{bmatrix} R_1 \\ R_2 \\ \vdots \\ R_M \end{bmatrix} \quad (28)$$

Similar to the above described embodiments, a least mean square algorithm may be employed to determine the elements $P_{v\mu}$ of the precompensation matrix P. This iterative method results in the following equation:

$$P_{v\mu}(k+1) = P_{v\mu}(k) - gr \cdot P_{v\mu}(k) \cdot \Delta R_\mu(k) \quad (29)$$

where k denotes a time index characterizing the iteration cycles and $v, \mu = 1, 2, \ldots, M$. The coefficient gr defines the time the iterative method needs to converge and the accuracy of the iterative method. For reasons of stability the coefficient gr shall not exceed a predetermined threshold value. The aforesaid iterative method is repeated until the entries $P_{v\mu}(k+1)$ of the precompensation matrix P converge.

According to a further embodiment, the effort to implement equation (29) may be reduced by using the signs of the real and imaginary parts of the elements $P_{v\mu}(k)$ and the sign of the error signals $\Delta R_\mu$:

$$P_{v\mu}(k+1) = P_{v\mu}(k) - gr \cdot \lfloor sgn(Re\{P_{v\mu}(k)\}) + j \cdot sgn(Im\{P_{v\mu}(k)\}) \rfloor \cdot sgn(\Delta R_\mu(k)) \quad (30)$$

As already described with respect to other embodiments, multiplication by the coefficient gr can be accomplished by using the following equation for the coefficient gr:

$$g = 2^{-Lr} \quad (31)$$

where the parameter Lr is an integer. The parameter Lr determines the time the iterative method needs to converge and the accuracy of the iterative method.

The iterative method according to equation (14) (or the simplified versions of equation (14)) and the iterative method according to equation (29) may be performed at the same time.

In the following exemplary simulations are presented which illustrate the methods described above. The simulated transmission network comprises five transmission lines $L_1$ to $L_5$, each of which comprises a twisted pair of wires. The lengths of the transmission lines $L_1$ to $L_5$ is between 400 m and 500 m. The diameter of the wires is about 0.5 mm. The simulation is carried out for a single frequency channel with a carrier frequency of about 8.5 MHz. The power spectrum density of the transmitted signals is −60 dBm/Hz. The noise signal has a power spectrum density of −140 dBm/Hz. The simulation is based on a 16 QAM modulation.

The coefficients of the equalizers $EQ_1$ to $EQ_5$ are initialized before starting the simulations. The coefficients of the equalizers $EQ_1$ to $EQ_5$ are calculated by using the transmission matrix H and are subsequently put out of tune of about 2%. While simulating the iterative method to determine the entries $P_{v\mu}(k)$ of the precompensation matrix P the coefficients of the equalizers $EQ_1$ to $EQ_5$ are readjusted to their target values by using a least mean square algorithm.

For the simulation of the method to determine the entries $P_{v\mu}(k)$ of the precompensation matrix P either the signs of the real and imaginary parts of the error signals $\Delta u_1(k)$ to $\Delta u_M(k)$ (see equation (15)) or only the real parts of the error signals $\Delta u_1(k)$ to $\Delta u_M(k)$ (see equation (16)) are fed back to the central office CO. The initial value of the coefficient g is $2^{-11}$. During the simulation the value of the coefficient g is gradually decreased.

In FIG. 6 the power transfer function of the precompensator of the longest transmission line $L_5$ (length=500 m) and its signal-to-noise ratio SNR are plotted versus 2000 DMT frames. If the DMT symbol rate is 4000 symbols/s, 2000 DMT frames correspond to 0.5 s. Each value shown in FIG. 6 is averaged over 50 simulation results.

The simulations shown in FIG. 6 for the transmission line $L_5$ result in a signal-to-noise ratio of about 49 dB. This corresponds to the power spectrum density of the transmitted signals of −60 dBm/Hz and the noise power spectrum density of −140 dBm/Hz.

Figure 6A:
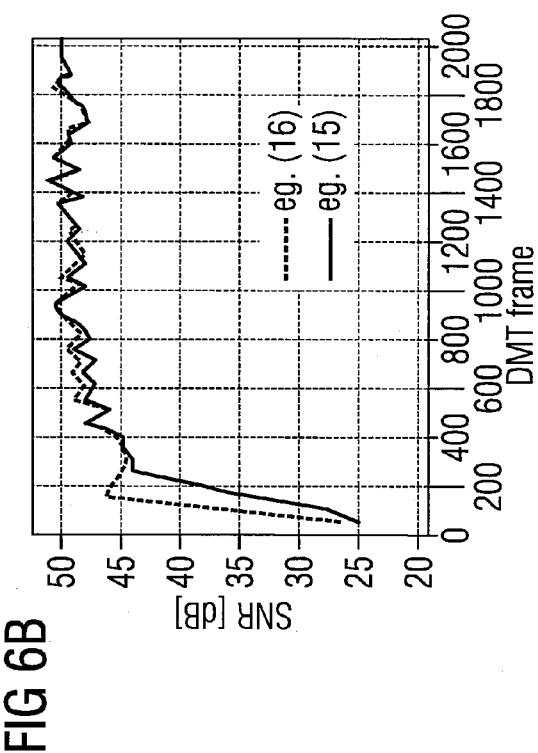
FIGS. 6A to 6H illustrate exemplary results of simulations of iterative methods according to embodiments.
Figure 6B:
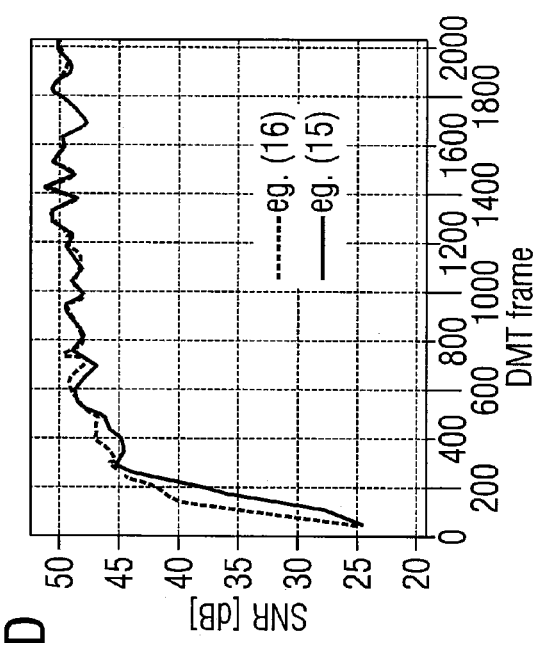

FIGS. 6A and 6B illustrate the results of the simulations when setting the elements of the precompensation matrix P is not decoupled from adjusting the coefficients of the equalizers $EQ_1$ to $EQ_M$. In FIG. 6C to 6H, setting the elements of the precompensation matrix P is decoupled from adjusting the coefficients of the equalizers $EQ_1$ to $EQ_M$.

Figure 7:
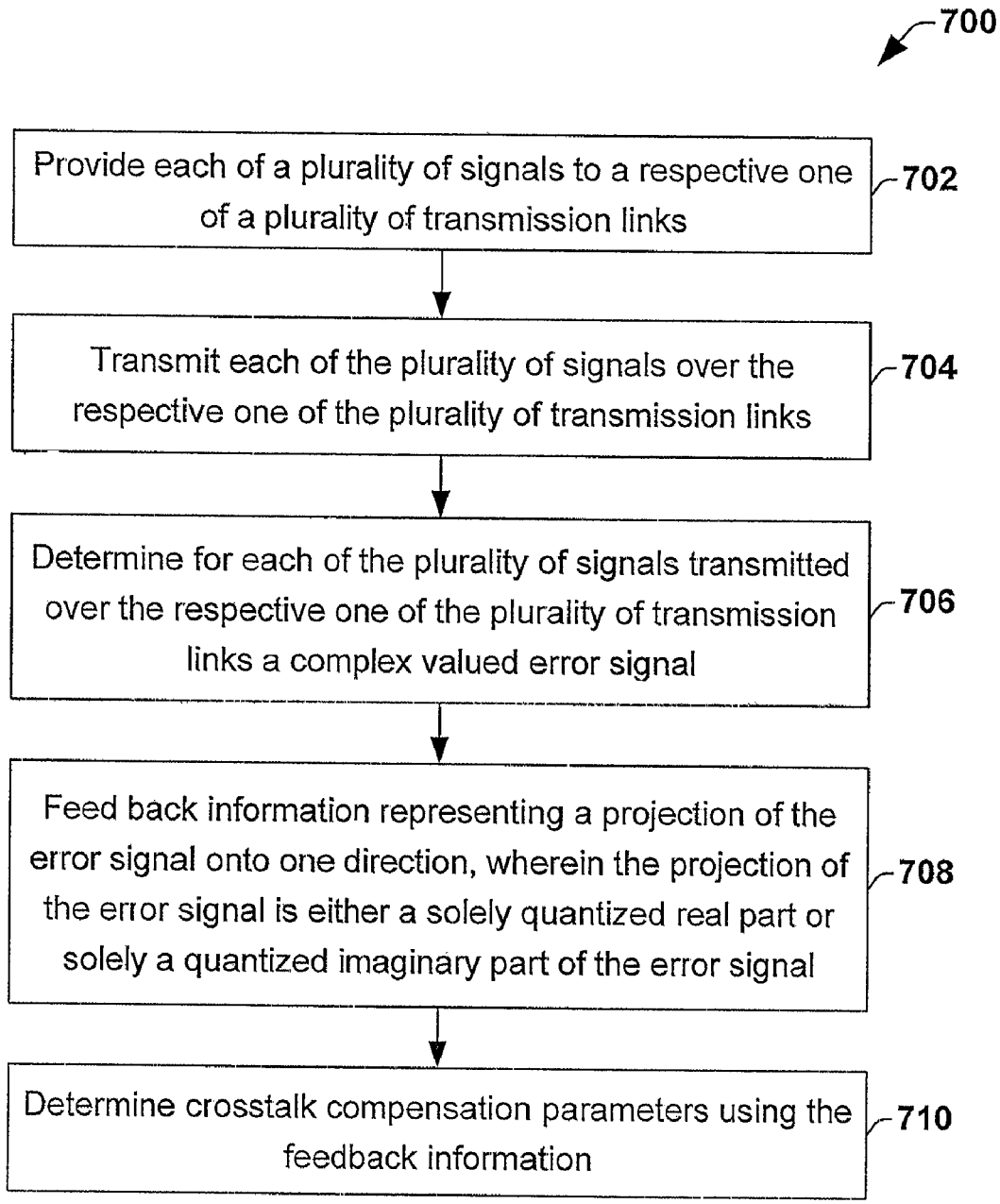
FIGS. 7 to 8 illustrate methods according to some embodiments.

FIG. 7 shows a method in accordance with some aspects of the disclosure. At 702, the method provides each of a plurality of signals to a respective one of a plurality of transmission links. At 704, each of the plurality of signals is transmitted over the respective one of the plurality of transmission links. At 706, the method determines for each of the plurality of signals transmitted over the respective one of the plurality of transmission links a complex valued error signal. At 708, the method feeds back information representing a projection of the error signal onto one direction, wherein the projection of the error signal is either a solely quantized real part or solely a quantized imaginary part of the error signal. At 710, the method determines crosstalk compensation parameters using the feedback information.

Figure 8:
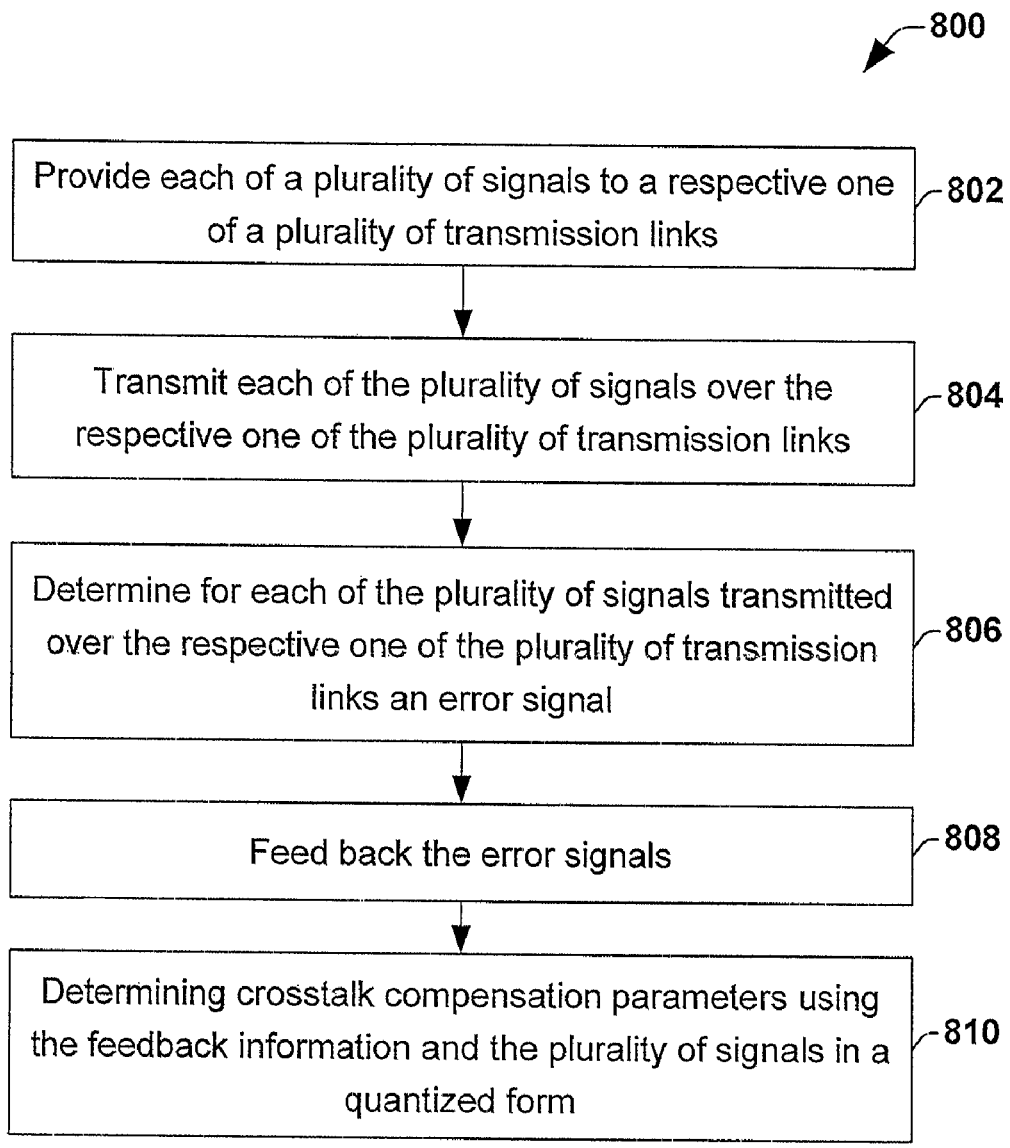

FIG. 8 shows a method in accordance with some aspects of the disclosure. At 802, the method provides each of a plurality of signals to a respective one of a plurality of transmission links. At 804, each of the plurality of signals is transmitted over the respective one of the plurality of transmission links.

At 806, the method determines for each of the plurality of signals transmitted over the respective one of the plurality of transmission links an error signal. At 808, the method feeds back the error signals. At 810, the method determines crosstalk compensation parameters using the feedback information and the plurality of signals in a quantized form. In this method 800, the plurality of signals provided to the plurality of transmission links are used in a quantized form to determine the crosstalk compensation parameters. In addition, the quantization of the plurality of signals provided to the plurality of transmission links is different from the quantization of the quantized form of the plurality of signals provided to the plurality of transmission links when used to determine the crosstalk compensation parameters.

Figure 6C:
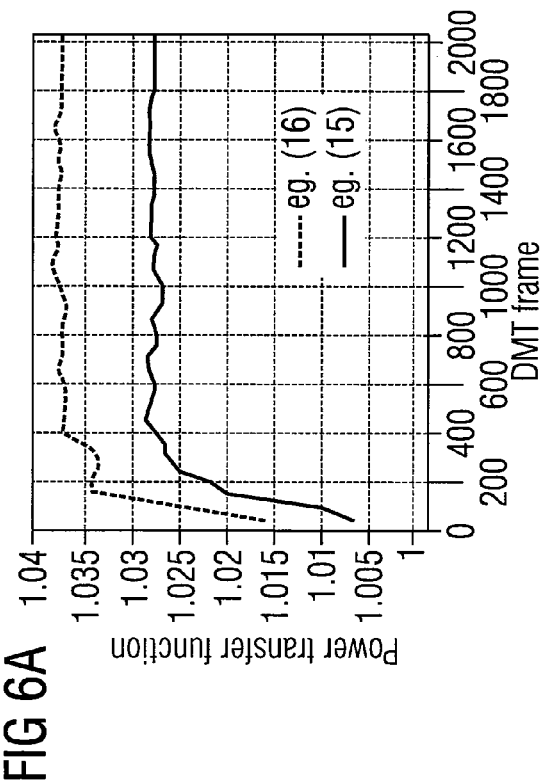
Figure 6D:
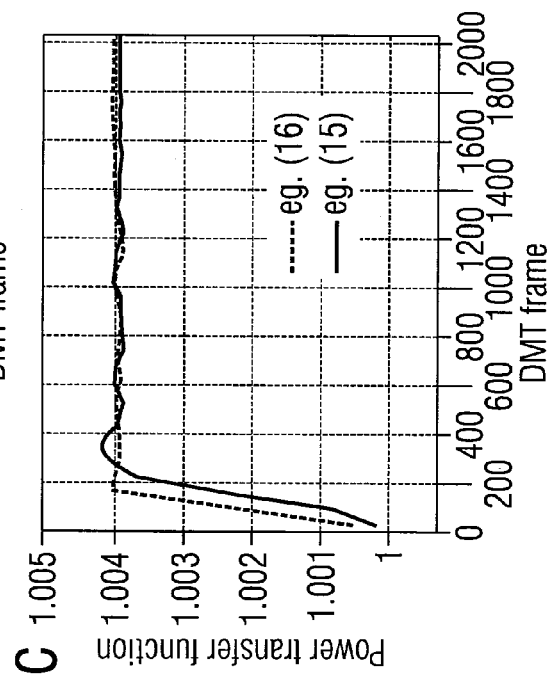

The simulations shown in FIGS. 6C and 6D are based on predetermined entries $P_{vv}(k)$ of the main diagonal of the precompensation matrix P. The entries $P_{vv}(k)$ were not adjusted during the simulation.

Figure 6E:
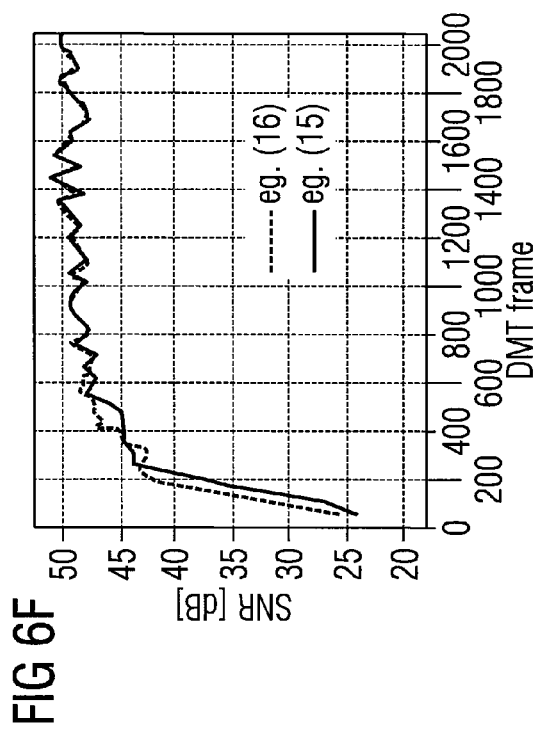
Figure 6F:
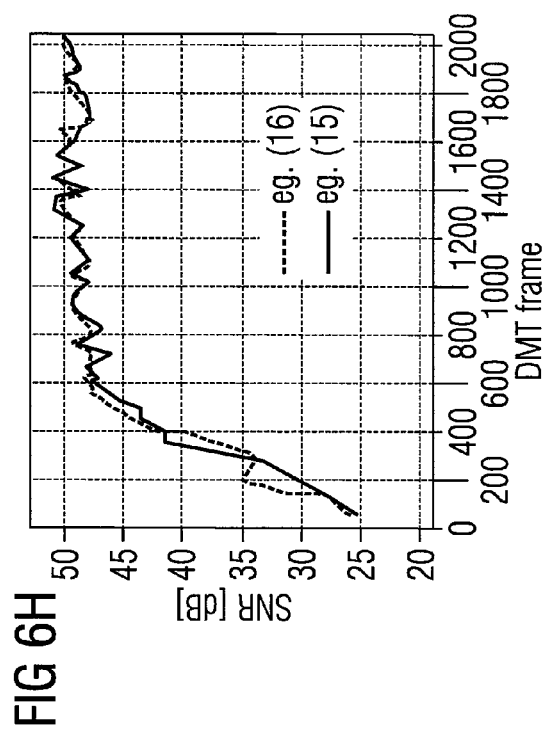

The least mean square algorithm according to equation (29) was employed to obtain the simulation results shown in FIGS. 6E and 6F.

Figure 6G:
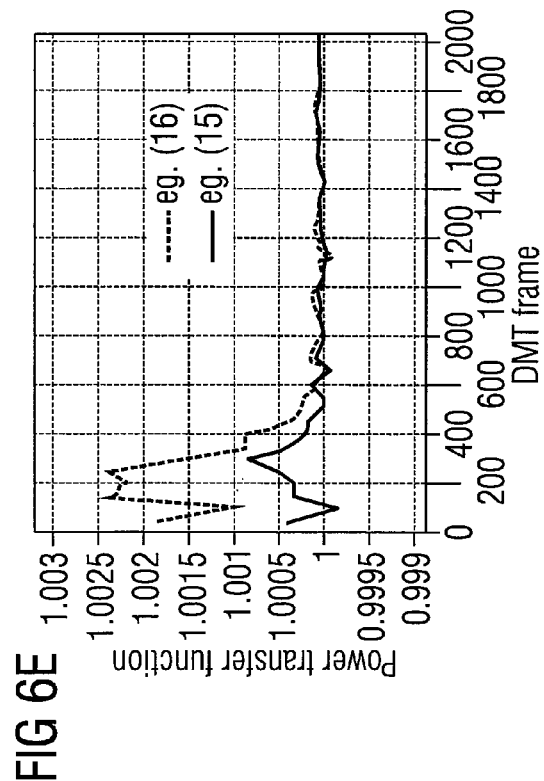
Figure 6H:
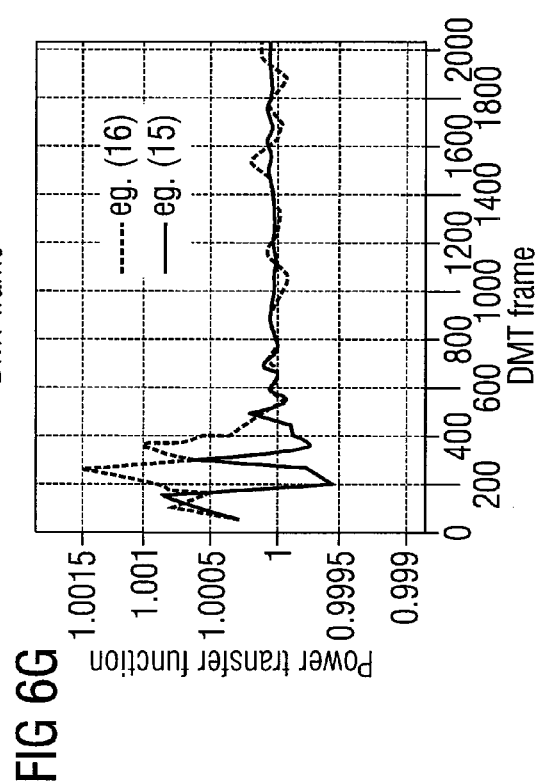

The least mean square algorithm according to equation (30) was employed to obtain the simulation results shown in FIGS. 6G and 6H.

While in the above exemplary embodiments have been described, it is to be understood that many modifications of these embodiments may be provided. For example, the transmission lines $L_1$ to $L_M$ may be replaced by wireless transmission links. Therefore, when reference is made to transmission lines, the transmission lines may be replaced by wireless transmission links.

The above exemplary systems may provide an xDSL system as well as a system of other services for transmitting data over the transmission lines $L_1$ to $L_M$. In addition, while the transmission system may use different frequency bands for downstream and upstream transmission, it may also use a same frequency band for both, downstream and upstream transmission. The above described embodiments are equally applicable to systems using timeslots for transmission.

In addition, while a particular feature or aspect of an embodiment may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A method, comprising:
   providing each of a plurality of signals to a respective one of a plurality of transmission links;
   transmitting each of the plurality of signals over the respective one of the plurality of transmission links;
   determining for each of the plurality of signals transmitted over the respective one of the plurality of transmission links a complex valued error signal;
   feeding back feedback information representing a projection of the error signal onto one direction, wherein the projection of the error signal is either solely a quantized real part or solely a quantized imaginary part of the error signal; and
   determining crosstalk compensation parameters using the feedback information.

2. The method of claim 1, wherein the crosstalk compensation parameters are crosstalk precompensation parameters.

3. The method of claim 1, wherein the steps of claim 1 are iteratively repeated.

4. The method of claim 3, wherein a parameter influencing the convergence of the iterative method is quantized.

5. The method of claim 1, wherein, for each of the error signals, a single bit is fed back.

6. The method of claim 1, wherein, for each of the error signals, the quantized real part and the quantized imaginary part of the respective error signal are the sign of the real part and the sign of the imaginary part of the respective error signal, respectively.

7. The method of claim 1, wherein, for successive error signals of each transmission link, the quantized real part and the quantized imaginary part of the respective error signals are fed back alternately.

8. The method of claim 1, wherein the determination of the crosstalk compensation parameters is based on a least mean square algorithm.

9. The method of claim 1, wherein the plurality of signals provided to the plurality of transmission links are used in a quantized form to determine the crosstalk compensation parameters.

10. The method of claim 9, wherein the quantized real part and/or the quantized imaginary part of each of the plurality of signals provided to the plurality of transmission links is used to determine the crosstalk compensation parameters.

11. The method of claim 9, wherein the sign of the real part and/or the sign of the imaginary part of each of the plurality of signals provided to the plurality of transmission links is used to determine the crosstalk compensation parameters.

12. The method of claim 1, wherein the crosstalk compensation parameters are used to mitigate the effects of FEXT.

13. A device, comprising:
   a plurality of output terminals to provide a plurality of signals to a plurality of transmission links;
   at least one input terminal to receive a received information representing a projection of a complex valued error signal onto one direction, wherein the projection of the error signal is either solely a quantized real part or solely a quantized imaginary part of the error signal; and
   a determination circuit, coupled to the at least one input terminal, to determine crosstalk compensation parameters using the received information.

14. The device of claim 13, wherein the crosstalk compensation parameters are crosstalk precompensation parameters.

15. The device of claim 13, wherein each of the signals received at the at least one input terminal represents a single bit.

16. The device of claim 13, wherein the projection of the error signal is either a quantized real part or a quantized imaginary part of the error signal.

17. The device of claim 16, wherein the quantized real part and the quantized imaginary part of the error signal are the sign of the real part and the sign of the imaginary part of the error signal, respectively.

18. The device of claim 13, wherein the determination circuit determines the crosstalk compensation parameters by using a least mean square algorithm.

19. The device of claim 13, further comprising a quantizing circuit coupled to the determination circuit to provide the plurality of signals provided to the plurality of transmission links in a quantized form.

20. The device of claim 19, wherein the quantizing circuit provides the quantized real parts or the quantized imaginary parts of the plurality of signals provided to the plurality of transmission links.

21. The device of claim 19, wherein the quantizing circuit provides the signs of the real parts or the signs of the imaginary parts of the plurality of signals provided to the plurality of transmission links.

22. The device of claim 13, wherein the crosstalk compensation parameters are used to mitigate the effects of FEXT.

23. A device, comprising:
an input terminal to receive a signal from a transmission link;
a first determination circuit coupled to the input terminal to determine a complex valued error signal for the received signal;
a second determination circuit coupled to the first determination circuit to determine information representing a projection of the complex valued error signal onto one direction, wherein the projection of the complex valued error signal is either solely a quantized real part or solely a quantized imaginary part of the complex valued error signal;
an output terminal coupled to the second determination circuit to output the information representing the projection of the complex valued error signal.

24. The device of claim 23, wherein the quantized real part or the quantized imaginary part of the error signal are the sign of the real part or the sign of the imaginary part of the error signal, respectively.

25. A system, comprising:
a plurality of transmission links;
a plurality of transmitters to provide a plurality of signals to the plurality of transmission links;
a plurality of receivers to receive the plurality of signals transmitted over the plurality of transmission links;
a plurality of first determination circuits to determine for each of the plurality of received signals a complex valued error signal;
a plurality of feedback circuits to feed back for each of the error signals feedback information representing a projection of the respective error signal onto one direction, wherein the projection of the error signal is either solely a quantized real part or solely a quantized imaginary part of the error signal; and
a second determination circuit to determine crosstalk compensation parameters using the feedback information.

* * * * *